US012619479B2

(12) United States Patent
Goyal et al.

(10) Patent No.: US 12,619,479 B2
(45) Date of Patent: May 5, 2026

(54) ARTIFICIAL INTELLIGENCE MODEL MANAGEMENT

(71) Applicant: International Business Machines Corporation, Armonk, NY (US)

(72) Inventors: Prateek Goyal, Indore (IN); Manish Anand Bhide, Hyderabad (IN); Trent A. Gray-Donald, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 17/646,994

(22) Filed: Jan. 4, 2022

(65) Prior Publication Data

US 2023/0214276 A1 Jul. 6, 2023

(51) Int. Cl.
G06F 9/54 (2006.01)

(52) U.S. Cl.
CPC .................................. G06F 9/541 (2013.01)

(58) Field of Classification Search
USPC ......................................................... 719/328
See application file for complete search history.

(56) References Cited

U.S. PATENT DOCUMENTS

| | | | | |
|---|---|---|---|---|
| 10,026,041 | B2 * | 7/2018 | Narayanan | .......... G06F 9/44526 |
| 11,636,377 | B1 * | 4/2023 | Xu | ........................... G06N 7/01 |
| | | | | 706/12 |

| | | | | |
|---|---|---|---|---|
| 2019/0384804 | A1 | 12/2019 | Bhide et al. | |
| 2021/0027136 | A1 * | 1/2021 | Hwang | ................... G06N 20/20 |
| 2021/0049497 | A1 | 2/2021 | Jia et al. | |
| 2021/0117859 | A1 | 4/2021 | Rogers et al. | |
| 2021/0136170 | A1 * | 5/2021 | Katre | .................... H04L 67/565 |
| 2022/0027793 | A1 * | 1/2022 | Bang | ...................... G06N 20/00 |
| 2022/0058512 | A1 * | 2/2022 | Noorizadeh | ........... G06N 20/00 |
| 2022/0366723 | A1 * | 11/2022 | Numaoka | ............... G06F 3/011 |

OTHER PUBLICATIONS

"Data model automatic upgrade," An IP.com Prior Art Database Technical Disclosure, Sep. 8, 2011, 3 pages.
Akhotia, "How to Integrate Machine Learning into Web Applications with Flask," Sep. 5, 2020, 18 pages, available at http://www.analyticsvidhya.com/blog/.
Mell et al., "The NIST Definition of Cloud Computing", Computer Security Division, National Institute of Standards and Technology, Jan. 2011, 7 pages.

* cited by examiner

*Primary Examiner* — Chat C Do
*Assistant Examiner* — William C Wood
(74) *Attorney, Agent, or Firm* — Yee & Associates, P.C.

(57) ABSTRACT

A computer implemented method manages an artificial intelligence model. A number of processor units detect a change in a format used to exchange information between the artificial intelligence model and an application using the artificial intelligence model. The number of processor units changes the format of the information into an expected format used by the artificial intelligence model and the application. The number of processor units exchanges the information between the artificial intelligence model and the application using the expected format.

17 Claims, 10 Drawing Sheets

120N
LOCAL
COMPUTING
DEVICE

LOCAL COMPUTING
DEVICE
120B

100
CLOUD COMPUTING
ENVIRONMENT

110
CLOUD COMPUTING
NODES

LOCAL COMPUTING
DEVICE
120C

120A
LOCAL
COMPUTING
DEVICE

Figure 3:
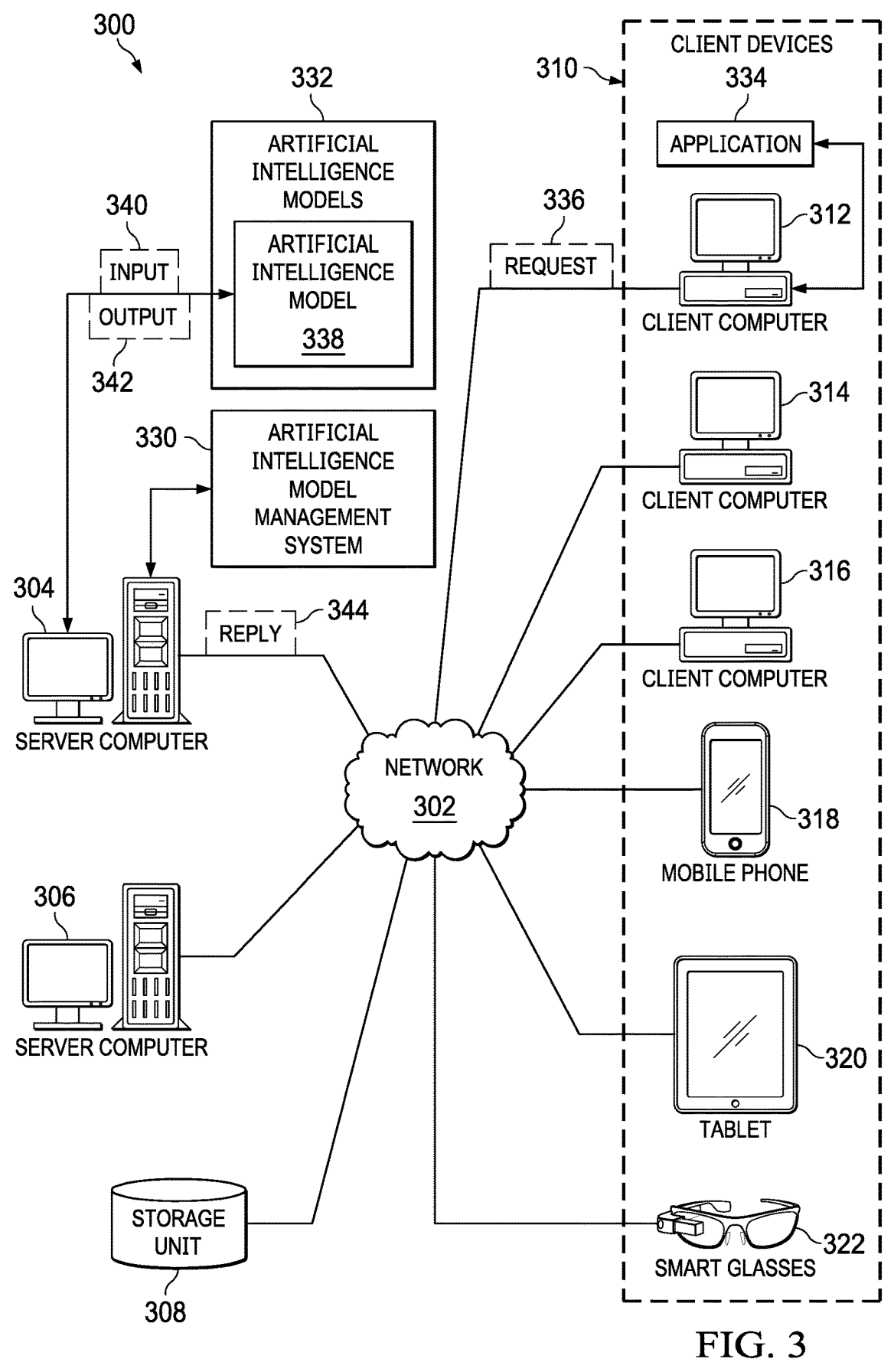

300

332

ARTIFICIAL
INTELLIGENCE
MODELS

340

INPUT

OUTPUT

342

ARTIFICIAL
INTELLIGENCE
MODEL

338

330

ARTIFICIAL
INTELLIGENCE
MODEL
MANAGEMENT
SYSTEM

304

SERVER COMPUTER

344

REPLY

336

REQUEST

310

CLIENT DEVICES

334

APPLICATION

312

CLIENT COMPUTER

314

CLIENT COMPUTER

316

CLIENT COMPUTER

NETWORK

302

318

MOBILE PHONE

306

SERVER COMPUTER

320

TABLET

322

SMART GLASSES

STORAGE
UNIT

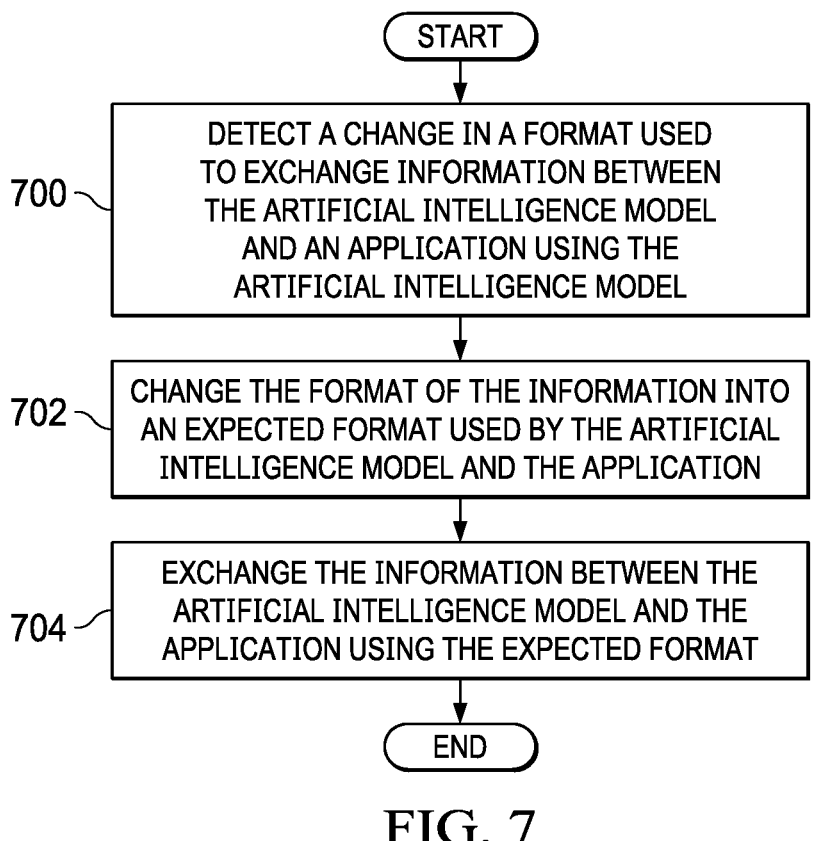

START

700 — DETECT A CHANGE IN A FORMAT USED TO EXCHANGE INFORMATION BETWEEN THE ARTIFICIAL INTELLIGENCE MODEL AND AN APPLICATION USING THE ARTIFICIAL INTELLIGENCE MODEL

702 — CHANGE THE FORMAT OF THE INFORMATION INTO AN EXPECTED FORMAT USED BY THE ARTIFICIAL INTELLIGENCE MODEL AND THE APPLICATION

704 — EXCHANGE THE INFORMATION BETWEEN THE ARTIFICIAL INTELLIGENCE MODEL AND THE APPLICATION USING THE EXPECTED FORMAT

END

FIG. 7

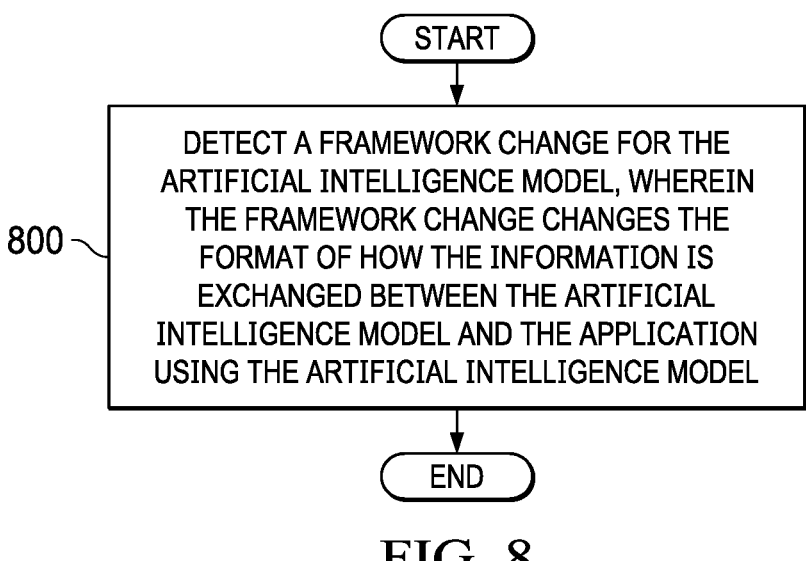

START

800 — DETECT A FRAMEWORK CHANGE FOR THE ARTIFICIAL INTELLIGENCE MODEL, WHEREIN THE FRAMEWORK CHANGE CHANGES THE FORMAT OF HOW THE INFORMATION IS EXCHANGED BETWEEN THE ARTIFICIAL INTELLIGENCE MODEL AND THE APPLICATION USING THE ARTIFICIAL INTELLIGENCE MODEL

END

FIG. 8

ARTIFICIAL INTELLIGENCE MODEL MANAGEMENT

BACKGROUND

1. Field

The disclosure relates generally to improved computer system and more specifically to managing artificial intelligence models using application programming interfaces.

2. Description of the Related Art

Artificial intelligence models are models that have has intelligent behavior. For example, in artificial intelligence model can receive the environment and perform actions that maximize the probability of achieving a goal for which the artificial intelligence model has been constructed. An artificial model in some cases can mimic cognitive functions associated with the human mind. For example, an artificial intelligence model can include functions such as learning and problem-solving and can be based on the function of a human brain.

An artificial intelligence model can change or evolve over time. As artificial intelligence models are used different issues can occur over time such as model drift, drop in accuracy, fairness issues, or other issues. When these issues are encountered, a new version of the artificial model can be created to address these issues.

SUMMARY

According to one illustrative embodiment, a computer implemented method manages an artificial intelligence model. A number of processor units detect a change in a format used to exchange information between the artificial intelligence model and an application using the artificial intelligence model. The number of processor units changes the format of the information into an expected format used by the artificial intelligence model and the application. The number of processor units exchanges the information between the artificial intelligence model and the application using the expected format. According to other illustrative embodiments, a computer system, and a computer program product for managing an artificial intelligence model are provided.

BRIEF DESCRIPTION OF THE DRAWINGS

FIG. 3 is a pictorial representation of a network of data processing systems in which illustrative embodiments may be implemented;

FIG. 7 is a flowchart of a process for managing an artificial intelligence model in accordance with an illustrative embodiment;

FIG. 8 is a flowchart of a process for detecting a change in format in accordance with an illustrative embodiment;

DETAILED DESCRIPTION

Figure 1:
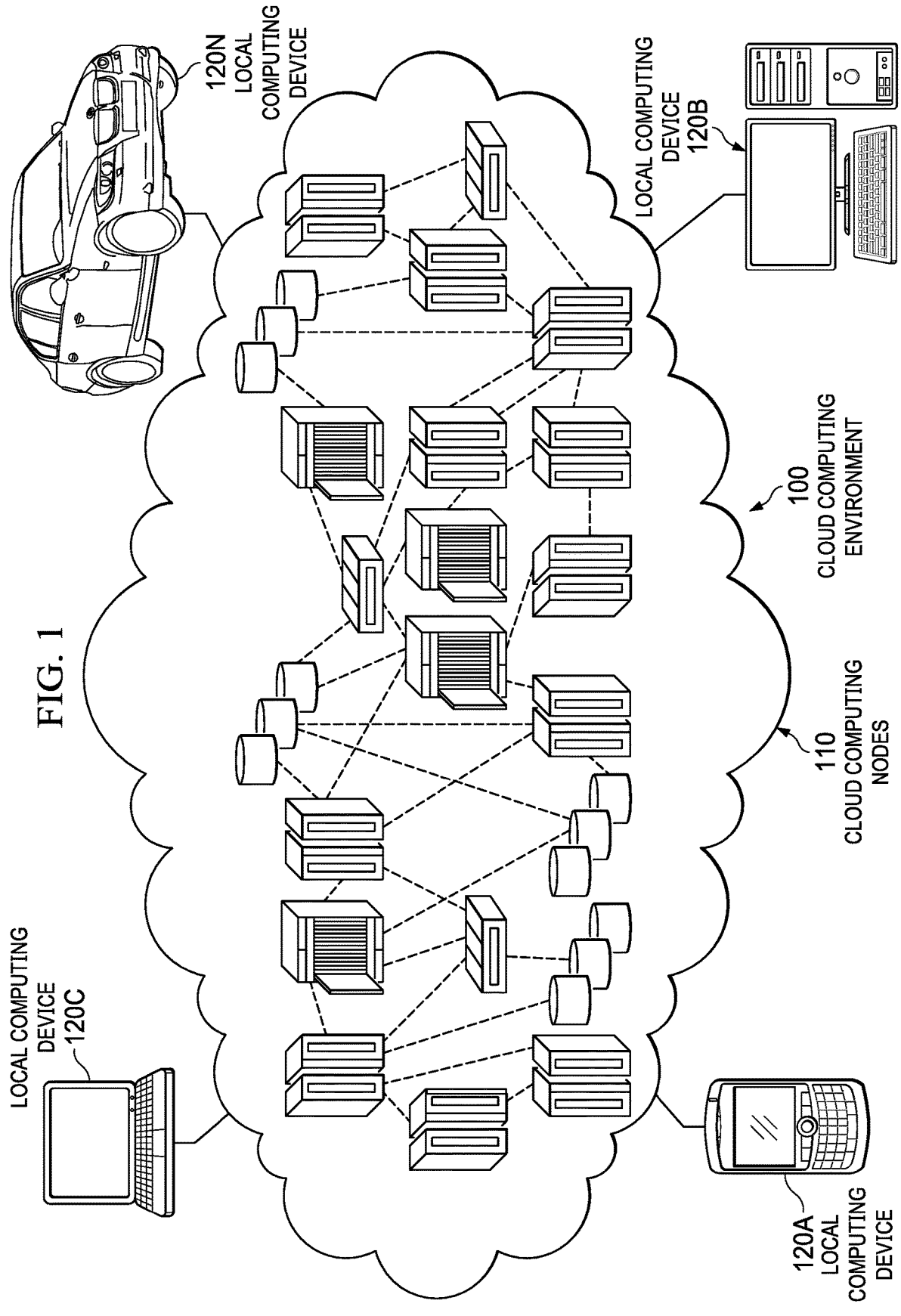
FIG. 1 is a diagram illustrating a cloud computing environment in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference now to FIG. 1, a diagram illustrating a cloud computing environment is depicted in which illustrative embodiments may be implemented. In this illustrative example, cloud computing environment 100 includes a set of one or more cloud computing nodes 110 with which local computing devices used by cloud consumers, such as, for example, personal digital assistant or smart phone 120A, desktop computer 120B, laptop computer 120C, and/or automobile computer system 120N, may communicate.

Cloud computing nodes 110 may communicate with one another and may be grouped physically or virtually into one or more networks, such as private, community, public, or hybrid clouds as described hereinabove, or a combination thereof. This allows cloud computing environment 100 to offer infrastructure, platforms, and/or software as services for which a cloud consumer does not need to maintain resources on a local computing device, such as local computing devices 120A-120N. It is understood that the types of local computing devices 120A-120N are intended to be illustrative only and that cloud computing nodes 110 and cloud computing environment 100 can communicate with any type of computerized device over any type of network and/or network addressable connection using a web browser, for example.

Figure 2:
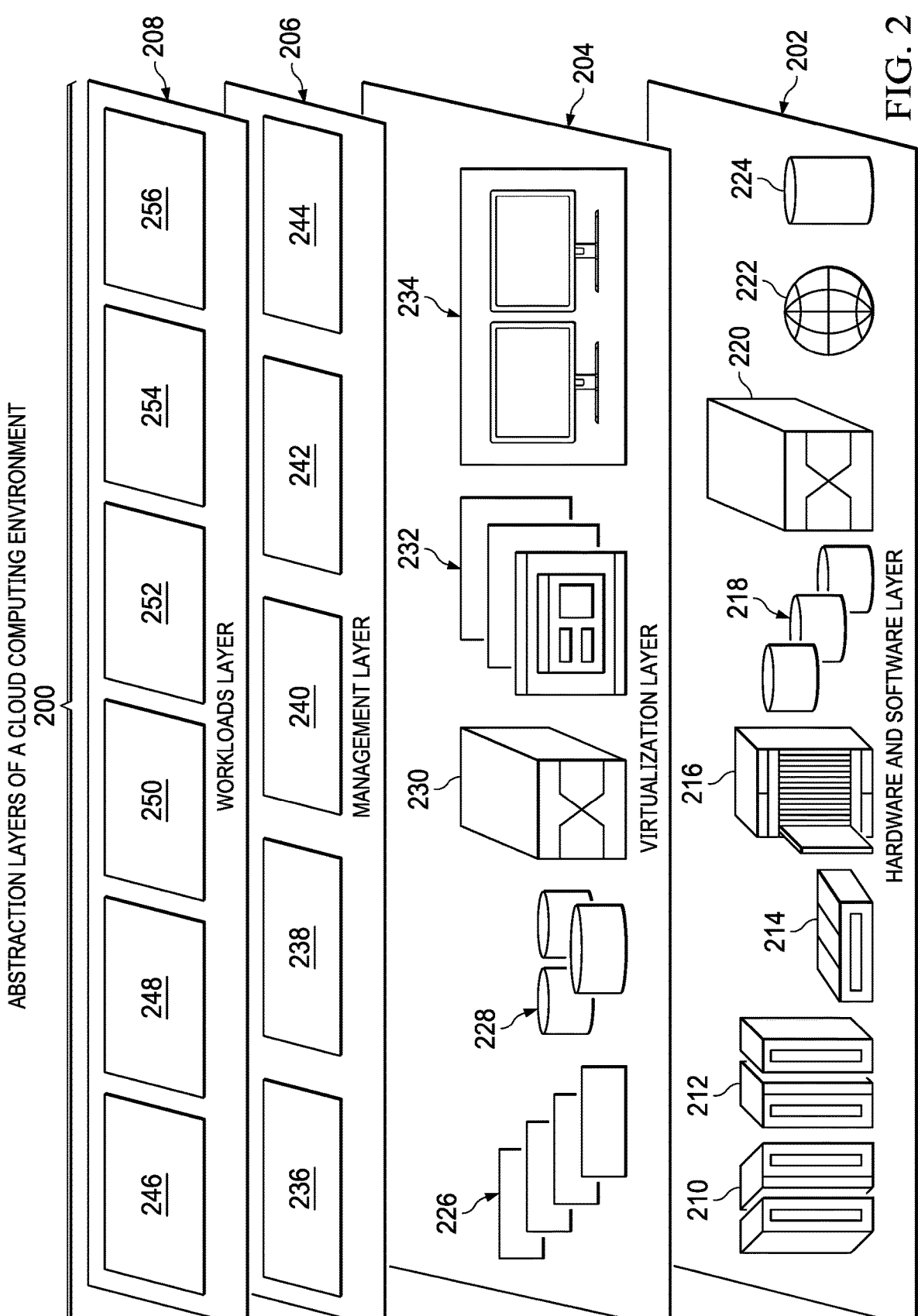
FIG. 2 is a diagram illustrating abstraction model layers in accordance with an illustrative embodiment.

With reference now to FIG. 2, a diagram illustrating abstraction model layers is depicted in accordance with an illustrative embodiment. The set of functional abstraction layers shown in this illustrative example may be provided by a cloud computing environment, such as cloud computing environment 100 in FIG. 1. It should be understood in advance that the components, layers, and functions shown in FIG. 2 are intended to be illustrative only and the embodiments are not limited thereto. As depicted, the following layers and corresponding functions are provided.

Abstraction layers of a cloud computing environment 200 include hardware and software layer 202, virtualization layer 204, management layer 206, and workloads layer 208. Hardware and software layer 202 includes the hardware and software components of the cloud computing environment. The hardware components may include, for example, mainframes 210, RISC (Reduced Instruction Set Computer) architecture-based servers 212, servers 214, blade servers 216, storage devices 218, and networks and networking components 220. In some illustrative embodiments, software components may include, for example, network application server software 222 and database software 224.

Virtualization layer 204 provides an abstraction layer from which the following examples of virtual entities may be provided: virtual servers 226; virtual storage 228; virtual networks 230, including virtual private networks; virtual applications and operating systems 232; and virtual clients 234.

In one example, management layer 206 may provide the functions described below. Resource provisioning 236 provides dynamic procurement of computing resources and other resources, which are utilized to perform tasks within the cloud computing environment. Metering and pricing 238 provide cost tracking as resources are utilized within cloud computing environment, and billing or invoicing for consumption of these resources. In one example, these resources may comprise application software licenses. Security provides identity verification for cloud consumers and tasks, as well as protection for data and other resources. User portal 240 provides access to the cloud computing environment for consumers and system administrators. Service level management 242 provides cloud computing resource allocation and management such that required service levels are met. Service level agreement (SLA) planning and fulfillment 244 provides pre-arrangement for, and procurement of, cloud computing resources for which a future requirement is anticipated in accordance with an SLA.

Workloads layer 208 provides examples of functionality for which the cloud computing environment may be utilized. Example workloads and functions, which may be provided by workload layer 208, may include mapping and navigation 246, software development and lifecycle management 248, virtual classroom education delivery 250, data analytics processing 252, transaction processing 254, and artificial intelligence model management 256. In this illustrative example, artificial intelligence model management 256 can provide services to manage the interaction between clients and artificial intelligence models within cloud computing environment 200.

With reference now to FIG. 3, a pictorial representation of a network of data processing systems is depicted in which illustrative embodiments may be implemented. Network data processing system 300 is a network of computers in which the illustrative embodiments may be implemented. Network data processing system 300 contains network 302, which is the medium used to provide communications links between various devices and computers connected together within network data processing system 300. Network 302 may include connections, such as wire, wireless communication links, or fiber optic cables.

In the depicted example, server computer 304 and server computer 306 connect to network 302 along with storage unit 308. In addition, client devices 310 connect to network 302. As depicted, client devices 310 include client computer 312, client computer 314, and client computer 316. Client devices 310 can be, for example, computers, workstations, or network computers. In the depicted example, server computer 304 provides information, such as boot files, operating system images, and applications to client devices 310. Further, client devices 310 can also include other types of client devices such as mobile phone 318, tablet computer 320, and smart glasses 322. In this illustrative example, server computer 304, server computer 306, storage unit 308, and client devices 310 are network devices that connect to network 302 in which network 302 is the communications media for these network devices. Some or all of client devices 310 can be in the form of an Internet-of-things (IoT) in which these physical devices can connect to network 302 and exchange information with each other over network 302.

Client devices 310 are clients to server computer 304 in this example. Network data processing system 300 may include additional server computers, client computers, and other devices not shown. Client devices 310 connect to network 302 utilizing at least one of wired, optical fiber, or wireless connections.

Program code located in network data processing system 300 can be stored on a computer-recordable storage media and downloaded to a data processing system or other device for use. For example, program code can be stored on a computer-recordable storage media on server computer 304 and downloaded to client devices 310 over network 302 for use on client devices 310.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 300 also may be implemented using a number of different types of networks. For example, network 302 can be comprised of at least one of the Internet, an intranet, a local area network (LAN), a metropolitan area network (MAN), or a wide area network (WAN). FIG. 3 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, artificial intelligence model management system 330 is located in server computer 304. Artificial intelligence model management system 330 operates to manage artificial intelligence models 332. In the illustrative example, artificial intelligence models 332 are located in server computer 304. In other illustrative examples, artificial intelligence models 332 can be located in other data processing systems such as server computer 306, client computer 316, or another suitable data processing systems.

As typically, application 334 is located in client computer 312. Application 334 accesses one or more of artificial intelligence models 332. In other words, application 334 is a client to artificial intelligence models 332. In this example, artificial intelligence model management system 330 acts as an interface between application 334 and artificial intelligence models 332.

For example, artificial intelligence model management system 330 receives request 336 from application 334 for artificial intelligence model 338 in artificial intelligence models 332. Artificial intelligence model management system 330 can format request 336 into input 340 into a format expected by artificial intelligence model 338. Input 340 is sent to artificial intelligence model 338. In response, artificial intelligence model 338 generates output 342 which is received by artificial intelligence model management system 330.

Artificial intelligence model management system 330 formats output 342 into reply 344. Reply 344 is in a format expected by application 334. Artificial intelligence model management system 330 returns reply 344 to application 334.

With artificial intelligence model management system 330 operating as an interface between artificial intelligence models 332 and application 334, changes made to artificial intelligence models 332 do not require any changes to the manner in which application 334 for sends request 336 and receives reply and 344. For example, new versions or changes to artificial intelligence model 338 can result in artificial intelligence model 338 using at least one of a different input format for input 340 or a different output format for output 342. Artificial intelligence model management system 330 operates insulate application 334 and other applications that may be running on client devices 310 from changes to artificial intelligence models 332.

In the illustrative example, artificial intelligence model management system 330 can continuously monitor artificial intelligence models 332 for changes in the input and output for artificial intelligence models 332. For example, if artificial intelligence model 338 as model quality that deteriorates due to new data being received or due to data and model drift, artificial intelligence model 338 can be retrained and a new version of artificial intelligence model 338 can be created from the retraining. In some cases, the new version may use a different framework which may result in a change in at least one of input 340 or output 342 used by artificial intelligence model 338.

Artificial intelligence model management system can detect this change and make adjustments to the manner in which at least one of input 340 or output 342 is formatted when artificial intelligence model 338 is used by application 334. In one illustrative example, artificial intelligence model management system 330 can use program instructions for services or components such as application programming interfaces (APIs) to support the different formats for input and output for artificial intelligence models 332 that may have changed. As a result, with the use of artificial intelligence model management system 330, updates to clients such as application 334 or other applications are unnecessary when one or more of artificial intelligence models 332 change the manner in inputs, outputs, or both are formatted.

The illustrative embodiments recognize and take into account a number of different considerations. For example, the illustrative embodiments recognize and take into account that as artificial intelligence models are modified or changed, the input format, the output format, or both for the artificial intelligence model can also change. The illustrative of embodiments recognize and take into account that this change can impact applications that use the modified artificial intelligence model. The illustrative embodiments recognize and take in account that is undesirable to modify the applications that are clients to the artificial intelligence model. The illustrative embodiments recognize and take into account that modifying applications that use the artificial intelligence model take more time, effort, and cost than is desirable.

Thus, the illustrative embodiments provide a computer implemented method, apparatus, computer system, and computer program product for managing an artificial intelligence model. A number of processor units detect a change in a format used to exchange information between the artificial intelligence model and an application using the artificial intelligence model. The number of processor units changes the format of the information into an expected format used by the artificial intelligence model and the application. The number of processor units exchanges the information between the artificial intelligence model and the application using the expected format.

Figure 4:
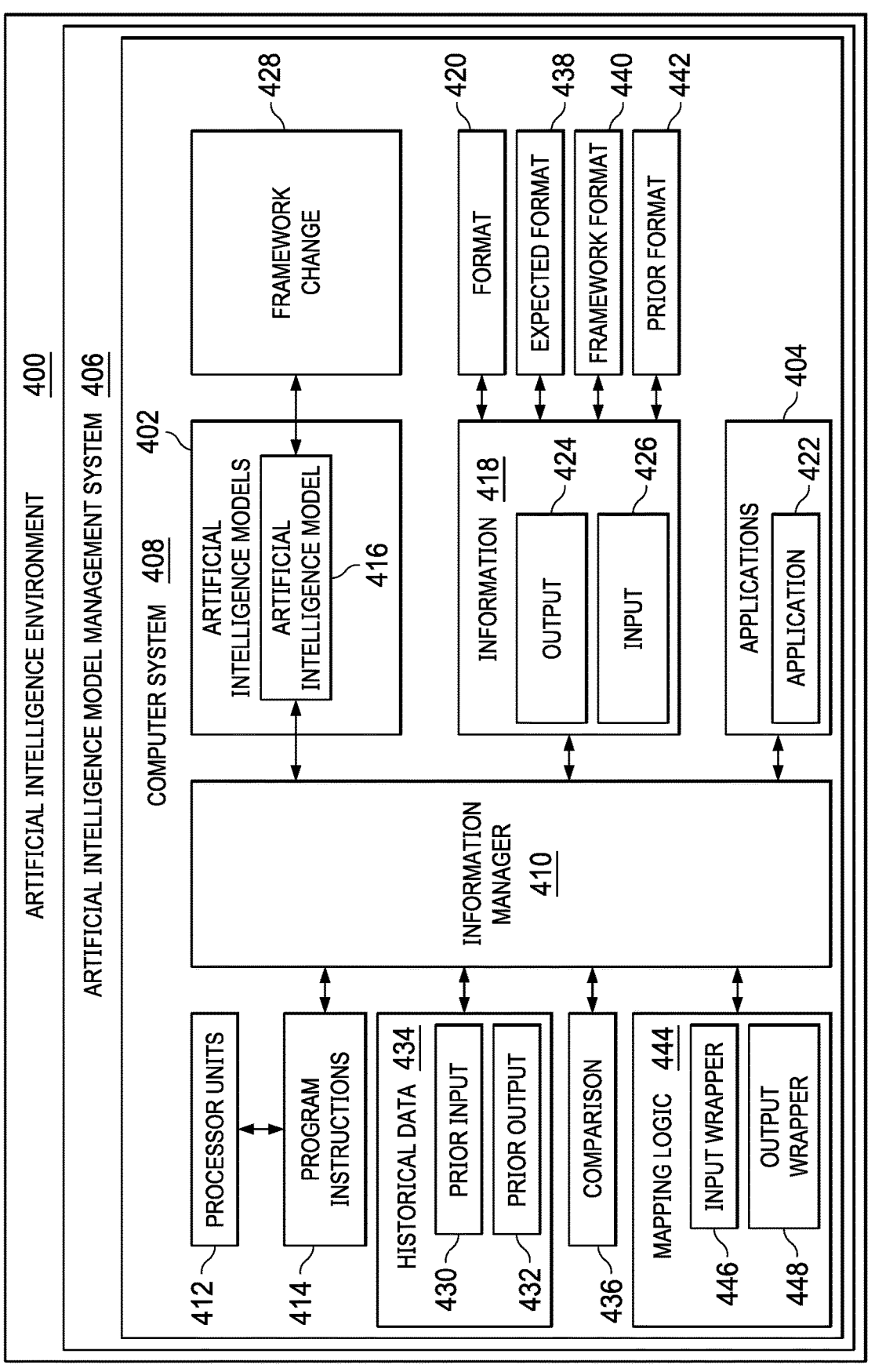
FIG. 4 is a block diagram of an artificial intelligence environment in accordance with an illustrative embodiment.

With reference now to FIG. 4, a block diagram of an artificial intelligence environment is depicted in accordance with an illustrative embodiment. In this illustrative example, artificial intelligence environment 400 includes components that can be implemented in hardware such as the hardware shown in network data processing system 300 in FIG. 3.

In this illustrative example, artificial intelligence models 402 in artificial intelligence environment 400 can be used by clients in the form of applications 404. As depicted, artificial intelligence model management system 406 can manage artificial intelligence models 402. For example, artificial intelligence model management system 406 can manage interaction between artificial intelligence models 402 and applications 404.

In the illustrative example, artificial intelligence model management system 406 comprises computer system 408 and information manager 410. Information manager 410 can be implemented in software, hardware, firmware or a combination thereof. When software is used, the operations performed by information manager 410 can be implemented in program instructions configured to run on hardware, such as a processor unit. When firmware is used, the operations performed by information manager 410 can be implemented in program instructions and data and stored in persistent memory to run on a processor unit. When hardware is employed, the hardware can include circuits that operate to perform the operations in information manager 410.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 408 is a physical hardware system and includes one or more data processing systems. When more than one data processing system is present in computer system 408, those data processing systems are in communication with each other using a communications medium. The communications medium can be a network. The data processing systems can be selected from at least one of a computer, a server computer, a tablet computer, or some other suitable data processing system.

As depicted, computer system 408 includes a number of processor units 412 that are capable of executing program instructions 414 implementing processes in the illustrative examples. As used herein a processor unit in the number of processor units 412 is a hardware device and is comprised of hardware circuits such as those on an integrated circuit that respond and process instructions and program code that operate a computer. When a number of processor units 412 execute program instructions 414 for a process, the number of processor units 412 is one or more processor units that can be on the same computer or on different computers. In other words, the process can be distributed between processor units on the same or different computers in a computer system. Further, the number of processor units 412 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

In one illustrative example, one or more illustrative examples are present that overcome a problem with exchanging information between artificial intelligence models and applications when artificial intelligence models are modified or changed. With an illustrative example, changes to applications that use artificial intelligence models is unnecessary. Instead, an information manager can change the format of at least one of an input or output into a format that is expected for use by at least one of the artificial intelligence model or the application. As result, no changes are needed to the artificial intelligence model or the application to exchange information between the artificial intelligence model and the application. As a result, applications are insulated from changes in artificial intelligence models.

In one illustrative example, information manager 410 in computer system 408 manages artificial intelligence model 416 in artificial intelligence models 402 in exchanging information 418 with applications 404. Information manager 410 detects a change in format 420 used to exchange information 418 between artificial intelligence model 416 and application 422 in applications 404 using artificial intelligence model 416. Information 418 can take a number of different forms. For example, information 418 can be selected from one of output 424 from artificial intelligence model 416, input 426 to artificial intelligence model 416, and both output 424 from artificial intelligence model 416 and input 426 to artificial intelligence model 416. In this illustrative example, input 426 is generated by application 422. For example, input 426 can be request for query sent to artificial intelligence model 416 from application 422. Output 424 is the result generated by artificial intelligence model 416.

The detection of the change in format 420 can be performed in a number of different ways by information manager 410. For example, information manager 410 can detect framework change 428 for artificial intelligence model 416. In this example, framework change 428 changes format 420 of how information 418 is exchanged between artificial intelligence model 416 and application 422 using artificial intelligence model 416.

In another illustrative example, information manager 410 can detect the change in format 420 by profiling format 420 of input 426 and output 424 of artificial intelligence model 416. Information manager 410 compares input 426 and output 424 to prior input and prior output 432 in historical data 434 for artificial intelligence model 416 to form comparison 436. Information manager 410 uses comparison 436 to detect the change in format 420 based on comparison 436 for at least one of input 426 or output 424.

Thus, information manager 410 can be model aware of changes to the manner in which one or more of artificial intelligence models 402 exchange information 418 with applications 404. In other words, information manager 410 can automatically detect when changes in format 420 used in exchanging information 418 between artificial intelligence models 402 and applications 404 occur.

In response to detecting a change in format 420, information manager 410 changes format 420 of information 418 to expected format 438 used by artificial intelligence model 416 and application 422. In other words, format 420 of information 418 is changed into a form that is used by artificial intelligence model 416 and application 422 even though format 420 is not the same between these two components. Information manager 410 operates to handle exchange of information 418 between artificial intelligence model 416 and application 422 without requiring any changes or updates to application 422. As a result, information manager 410 acts as an interface or wrapper between artificial intelligence model 416 and application 422. Information manager 410 exchanges information 418 between artificial intelligence model 416 and application 422 using expected format 438.

In changing format 420 of information 418, information manager 410 can automatically map format 420 of input 426 from application 422 to expected format 438 used by artificial intelligence model 416. As another example, information manager 410 can automatically map format 420 of output 424 from the artificial intelligence model 416 to expected format 438 used by application 422.

In this illustrative example, a mapping or changing of format 420 to expected format 438 for artificial intelligence model 416, application 422, or both can be performed using a number of different types of mechanisms. For example, format 420 of information 418 can be changed to expected format 438 using at least one of an application programming interface (API), code containing a logic for converting information 418 to expected format 438, or some other software components or program instructions that enable applications 404 to exchange information 418 with artificial intelligence models 402.

In an illustrative example, information manager 410 can change output 424 of artificial intelligence model 416 from framework format 440 for framework into prior format 442 used by application 422. As a result, application 422 does not need to have changes or modifications to use information output by artificial intelligence model 416 even though format 420 has changed.

As another example, information manager 410 can change input 426 to artificial intelligence model 416 from prior format 442 used by application 422 into framework format 440 for artificial intelligence model 416. With this example, changes to application 422 can be avoided while enabling application 422 to send request in input 426 to artificial intelligence model 416 in framework format 440 used by artificial intelligence model 416.

In another illustrative example, the change in format 420 may be sufficiently complicated that information manager 410 is unable to automatically make changes from format 420 to expected format 438. In other words, information manager 410 may not have the application programming interface or other logic present for selection in changing format 420 to expected format 438. In this case, information manager 410 can receive format mapping logic 444 for mapping format 420 of information 418 to expected format used by artificial intelligence model 416 and application 422. This logic can include at least one of input wrapper 446 or output wrapper 448. In this example, input wrapper 446 includes program instructions that convert input 426 sent by application 422 to expected format 438 used by artificial intelligence model 416. Output wrapper 448 includes program instructions that convert output 424 from artificial intelligence model 416 to expected format 438 used by application for 422. In this example, information manager 410 calls input wrapper 446 when input 426 is received from application 422 and calls output wrapper 448 when output 424 is received from artificial intelligence model 416.

Thus, with the use of information manager 410 in artificial intelligence model management system 406, exchange of information 418 between applications 404 and artificial intelligence models 402 can be performed when changes occur to the manner in which artificial intelligence models 402 receive input 426, generate output 424, or both receive input 426 and generate output 424. The changing of format 420 to expected format 438 by information manager 410 avoids needing to update, change, replace, or modify applications 404. As a result, the impact of changes to artificial intelligence models 402 on applications 404 for using artificial intelligence models 402 can be reduced using information manager 410 to manage the exchange of information 418. Computer system 408 can be configured to perform at least one of the steps, operations, or actions described in the different illustrative examples using software, hardware, firmware or a combination thereof. As a result, computer system 408 operates as a special purpose computer system in which information manager 410 in computer system 408 enables exchanging information between artificial intelligence models and applications even when the artificial intelligence models change the format in input are processed and outputs are generated. In particular, information manager 410 transforms computer system 408 into a special purpose computer system as compared to currently available general computer systems that do not have information manager 410.

In the illustrative example, the use of information manager 410 in computer system 408 integrates processes into a practical application managing artificial intelligence models in the exchange of information with applications that use the artificial intelligence models. In the illustrative examples, information manager 410 enables applications to continue to use the current format even though artificial intelligence models have changed format used.

The illustration of artificial intelligence environment 400 in FIG. 4 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, information manager 410 can managed exchange of information between more than one application and more than one artificial intelligence model. As another example, one or more information managers can be present in addition to information manager 410 in artificial intelligence model management system 406. The use of additional information managers can be used to increase the capacity to handle inputs from applications 404 and outputs from artificial intelligence models 402 as these inputs and outputs increase.

Figure 5:
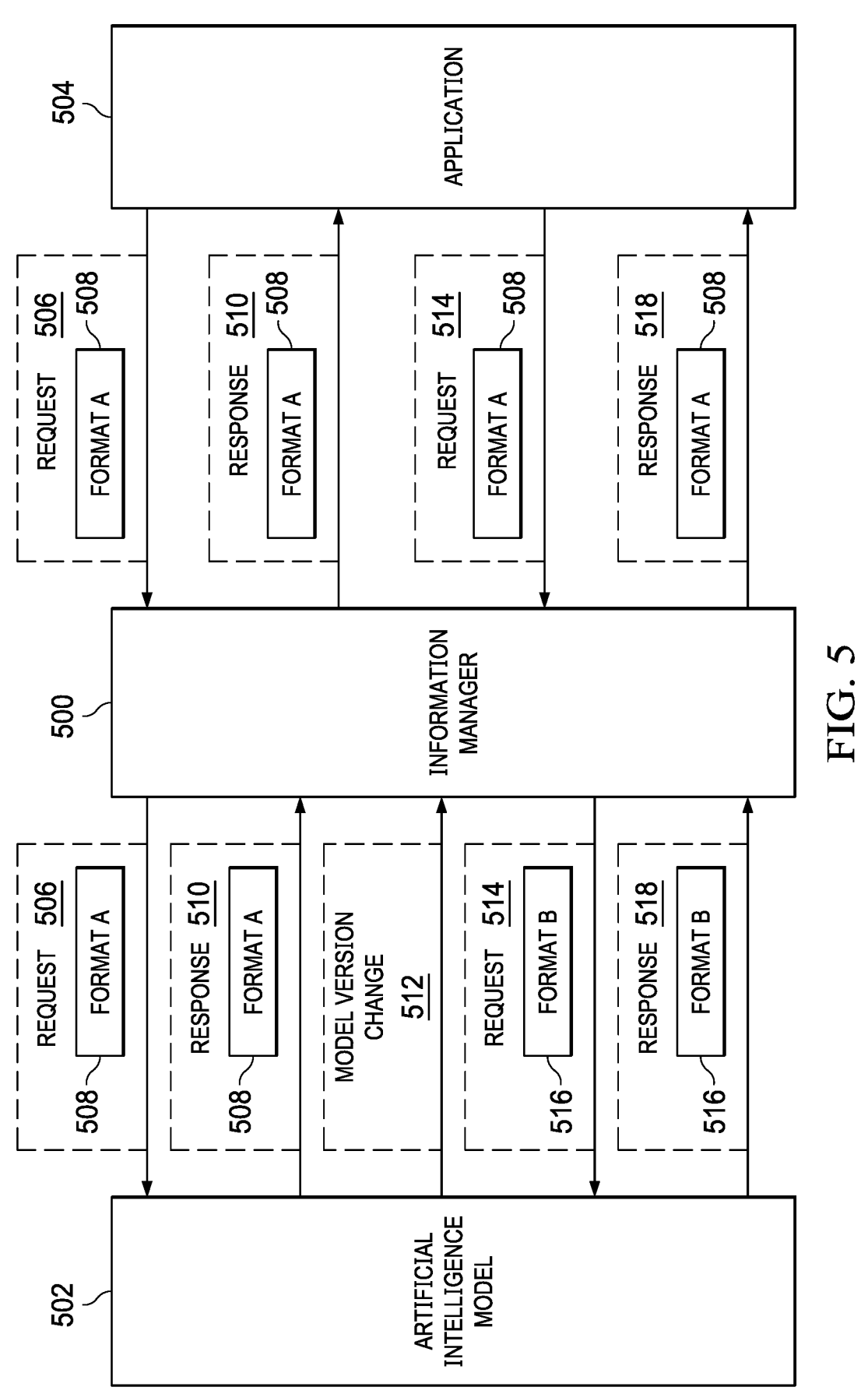
FIG. 5 is a dataflow diagram used in managing exchange of information between in artificial intelligence model and an application in accordance with an illustrative embodiment.

Turning to FIG. 5, a dataflow diagram used in managing exchange of information between in artificial intelligence model and an application is depicted in accordance with an illustrative embodiment. As depicted, information manager 500 facilitates the exchange of information between artificial intelligence model 502 and application 504. Information manager 500 is an example of an implementation of information manager 410 in FIG. 4. Artificial intelligence model 502 is an example of an artificial intelligence model in artificial intelligence model 402 and application 504 is an example of an implementation for applications 404 in FIG. 4.

As depicted, application 504 sends request 506 as an input to artificial intelligence model 502. Request 506 has format A 508. In this illustrative example, format A 508 is the format used by application 504 generate request 506. In this example, request 506 received by information manager 500, which sends request 506 to artificial intelligence model 502 as an input. As depicted, artificial intelligence model 502 also uses format A 508 when processing request 506.

In response, artificial intelligence model 502 generates response 510 in format A 508 as an output. Response 510 is received by information manager 500 and information manager 500 sends response 510 to application 504.

In this example, information manager 500 detects model version change 512 four artificial intelligence model 502. In this illustrative example, model version change 512 can be detected in a number of different ways. For example, model version change 512 can be detected in response to detecting a change in framework, through profiling inputs and outputs, user input, or using other mechanisms.

In this illustrative example, model version change 512 to artificial intelligence model 502 results in using a different format for exchanging information between artificial intelligence model 502 and application 504. As depicted, application 504 sends request 514 using format A 508. Information manager 500 received this request. Information manager 500 changes request 514 from format A 508 to format B 516. In this example, format B 516 is the format expected by artificial intelligence model 502 to properly process inputs.

In response, artificial intelligence model 502 generates an output in the form of response 518 using format B 516. Response 518 is received by information manager 500. Information manager 500 understands that application 504 cannot use format B 516 and changes the format of response 518 from format B 516 to format A 508. Information manager 500 sends response 518 in format A 508 to application 504.

As a result, application 504 can continue to exchange information with artificial intelligence model 502 using format A 508 while the new version of artificial intelligence model 502 uses format B 516 with information manager 500 facilitating the conversion of formats. As a result, changes to artificial intelligence model 502 do not require changes to application 504 for application 504 to continue to use artificial intelligence model 502.

In one illustrative example, artificial intelligence model 502 uses a scikit-learn framework. This framework provides a probability for input data points for each of the classes. For example, if artificial intelligence model 502 handles multiclass classification problems with three classes, the output of artificial intelligence model 502 can include in array such as [0.2, 0.7, 0.1]. This output implies the probability input data belonging to class 0 is 0.0, last 10.7, and class 0.1. When model version change 512 occurs with the framework of artificial intelligence model 502 being changed from scikit-learn to an SPSS statistics framework, artificial intelligence model 502 does not return a vector probability values. Instead, with this change to artificial intelligence model 502, artificial intelligence model 502 returns each probability of the class in a separate column. These columns can be named any specific manner such as $class_1_prob, $class_2_prob, and $class_3_prob.

Thus, the format information handled by artificial intelligence model 502 changes when a version change uses a different framework. In this depicted example, information manager 500 changes the output of artificial intelligence model 502 from format B 516 for SPSS statistics to format A 508 for scikit-learn when returning and output to application 504.

In another illustrative example, artificial intelligence model 502 can return a probability array such as [0.1, 0.9] for two classes for format A 508. A version change to artificial intelligence model 502 can result in using format B 516 for a probability. As a result, application 504 is unable to use this new format. Information manager 500 provides an ability to return the desired format which may also include sending request to artificial intelligence model 502 to obtain the probability of the other class.

As yet another illustrative example, format A 508 can receive an input of a first name and a second name as separate fields for format A 508. Model version change 512 can result in artificial intelligence model 502 expecting the full name as the input rather than a separate first payment second name for format B 516.

In yet another illustrative example, artificial intelligence model 502 may accept a date from application 504 in format A 508 such as month, date, year. When model version change 512 occurs for artificial intelligence model 502, artificial intelligence model 502 now expects the dates in format B 516, such as day, month, year.

With these different changes occurring in model version change 512 to artificial intelligence model 502, a big impact can occur on application 504 if information manager 500 is not used as an intermediary or interface to facilitate the change of information with the expected formats used by artificial intelligence model 502 and application 504. This impact can be in the building for application 504 to use artificial intelligence model 502, requiring a modification to application 504, reinstalling a new version of application 504, or some other change or action. With the use of information manager 500, impacts to application 504 can be reduced or eliminated.

Figure 6:
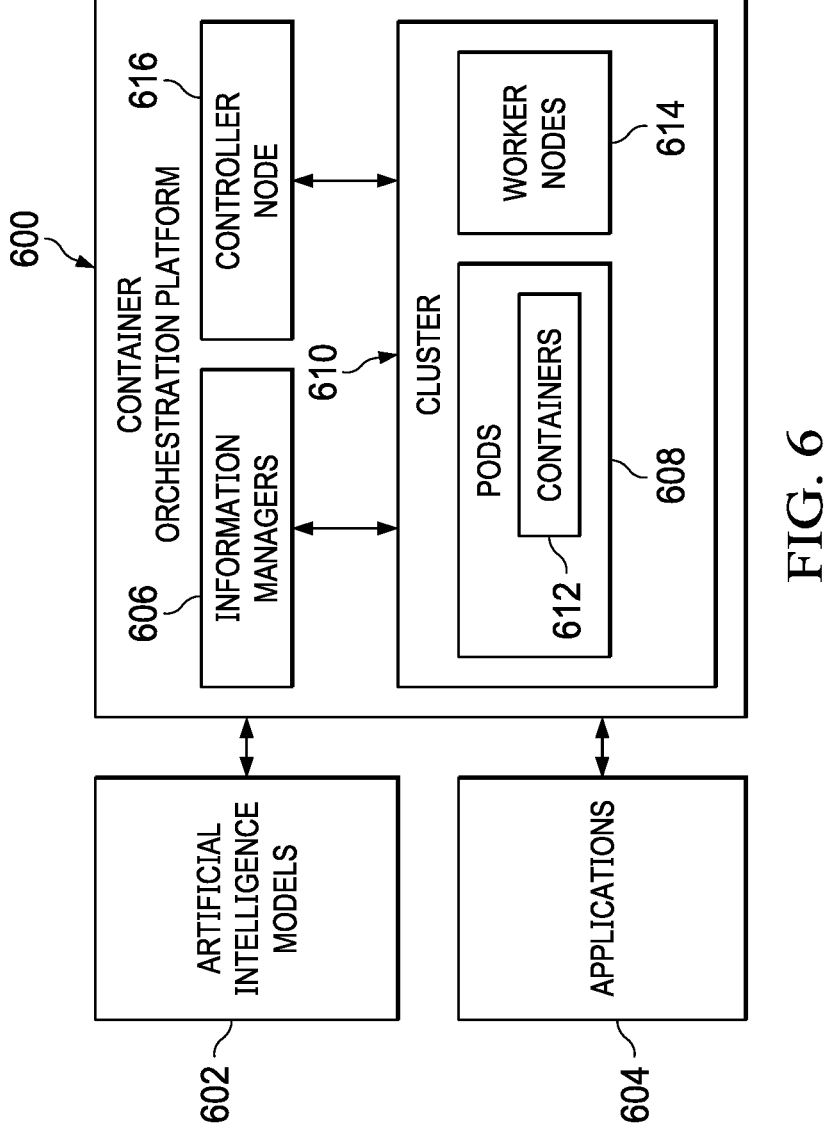
FIG. 6 is an illustration of scalability for managing exchange of information between artificial intelligence models and applications in accordance with an illustrative embodiment.

With reference to FIG. 6, an illustration of scalability for managing exchange of information between artificial intelligence models and applications is depicted in accordance with an illustrative embodiment. In this illustrative example, artificial intelligence model management system 406 in FIG. 4 can be implemented in container orchestration platform 600 for enabling scalability of information managers 606, such as information manager 410, for managing exchange of information between artificial intelligence models 602 and applications 604 based traffic levels requesting use of artificial intelligence models 602. The scalability enables providing a desired service level to meet service level agreements (SLA) for use of the artificial intelligence models.

As depicted, container orchestration platform 600 can be, for example, a Kubernetes® architecture, environment, or the like. However, it should be understood that description of illustrative examples using Kubernetes is meant as an example architecture only and not as a limitation on illustrative embodiments. Container orchestration platform 600 can also be referred to as a container orchestration system.

Container orchestration platform 600 provides a platform for automating deployment, scaling, and operations of information managers 606. In this illustrative example, cluster 610 runs in a Kubernetes® architecture, environment, or the like. However, it should be understood that description of illustrative examples using Kubernetes is meant as an example architecture only and not as a limitation on illustrative embodiments.

Container orchestration platform 600 provides a platform for automating deployment, scaling, and operations of information managers 606. Container orchestration platform 600 also provides automatic deployment, scaling, and operations of pods 608 and cluster 610. Each pod in pods 608 comprises a number of containers 612 running workloads for information managers 606 across cluster 610 of worker nodes 614.

These worker nodes 614 are also referred to as host nodes or minions. While the term "pod" is generally used in the Kubernetes paradigm, the term as used herein is not limited to that environment but rather refers to any grouping of a number of containers 612 where workloads are deployed and hold the running applications, libraries, and their dependencies.

A container is a standard unit of software for an application that packages up program instructions and all its dependencies, so the application can run on multiple computing environments. A container isolates software from the environment in which the container runs and ensures that the container works uniformly in different environments. A container for an application, such as an information manager, can share the operating system kernel on a machine with other containers for other applications. As a result, an operating system is not required for each container running on the machine.

Controller node 616 corresponds to cluster of worker nodes 614 that performs customer application workloads. Controller node 616 receives and tracks service requests from client device users requesting performance of services corresponding to information managers 606. Controller node 616, which is a main controlling unit of cluster 610 of worker nodes 614, manages a customer application for cluster 610 and directs communication across worker nodes 614 in cluster 610. A worker node in worker nodes 614 is a machine, either physical or virtual, where containers for applications are deployed. While the terms "controller node" and "worker node" are generally used in the Kubernetes paradigm, these terms as used herein are not limited to that environment but rather refer to any type of nodes that are capable of controlling and running information managers 606.

The illustration of container orchestration platform 600 is not meant to limit the manner in which other illustrative examples can be implemented. For example, the scaling of processes within cluster can be applied to artificial intelligence models 602 and application 604 in addition to information manager 606.

Turning next to FIG. 7, a flowchart of a process for managing an artificial intelligence model is depicted in accordance with an illustrative embodiment. The process in FIG. 7 can be implemented in hardware, software, or both. When implemented in software, the process can take the form of program instructions that is run by one of more processor units located in one or more hardware devices in one or more computer systems. For example, the process can be implemented in information manager 410 in computer system 408 in FIG. 4.

The process begins by detecting a change in a format used to exchange information between the artificial intelligence model and an application using the artificial intelligence model (step 700). In step 700, information can be selected from one of an output from the artificial intelligence model, an input to the artificial intelligence model, and the output from the artificial intelligence model and the input to the artificial intelligence model.

The process changes the format of the information into an expected format used by the artificial intelligence model and the application (step 702). The process exchanges the information between the artificial intelligence model and the application using the expected format (step 704). The process terminates thereafter.

With reference to FIG. 8, a flowchart of a process for detecting a change in format is depicted in accordance with an illustrative embodiment. The process depicted in this flowchart is an example of one limitation for step 702 in FIG. 7.

The process the detects a framework change for the artificial intelligence model, wherein the framework change changes the format of how the information is exchanged between the artificial intelligence model and the application using the artificial intelligence model (step 800). In step 800, the process can receive a notification that a framework change has occurred. In another illustrative example, the process can compare the current framework identifier with a prior framework identifier for the artificial intelligence model. The process terminates thereafter.

Figures 9, 10, 11:
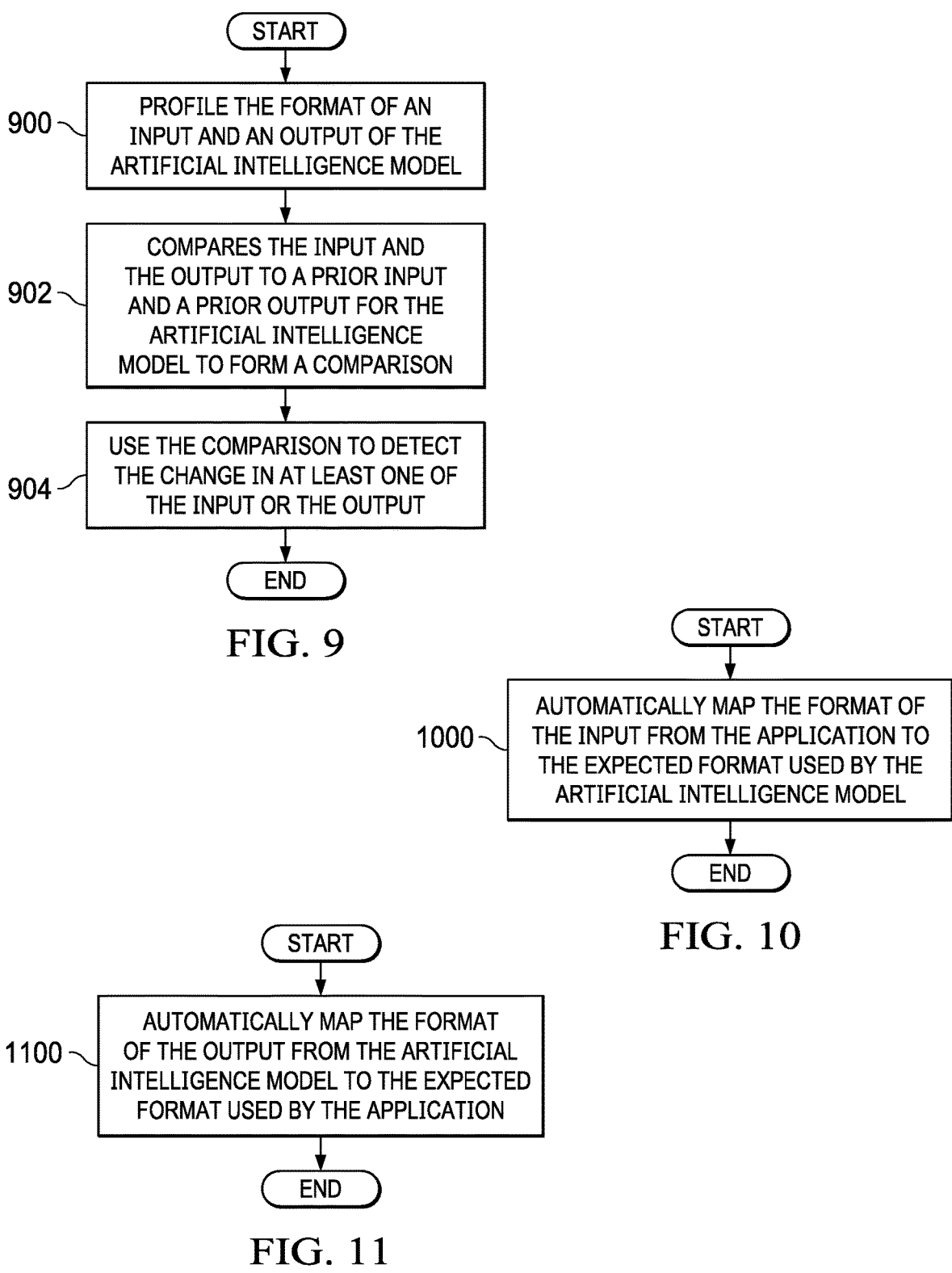
FIG. 9 is a flowchart of a process for detecting a change in format in accordance with an illustrative embodiment.
FIG. 10 is a flowchart of a process for changing a format of information in accordance with an illustrative embodiment.
FIG. 11 is a flowchart of a process for changing a format of information in accordance with an illustrative embodiment.

Turning now to FIG. 9, a flowchart of a process for detecting a change in format is depicted in accordance with an illustrative embodiment. The process depicted in FIG. 9 is an example of one limitation for step 702 in FIG. 7.

The process profiles the format of an input and an output of the artificial intelligence model (step 900). In step 900, the process identifies the format the input and output. For example, the process can determine what format is used for a date in an input to the artificial intelligence model for a date output by artificial intelligence model. In another example, the process can determine whether an input is a first name and then a second name or the full name containing both the first name and last at the same time.

The process compares the input and the output to a prior input and a prior output for the artificial intelligence model to form a comparison (step 902). The prior input and prior output can be identified from a historical database inputs and outputs for the artificial intelligence model.

The process uses the comparison to detect the change in at least one of the input or the output (step 904). The process terminates thereafter.

Turning next to FIG. 10, a flowchart of a process for changing a format of information is depicted in accordance with an illustrative embodiment. The process in this flowchart is an example of one implementation for step 702 in FIG. 7.

The process automatically maps the format of the input from the application to the expected format used by the artificial intelligence model (step 1000). The process terminates thereafter.

In FIG. 11, a flowchart of a process for changing a format of information is depicted in accordance with an illustrative embodiment. The process in this flowchart is an example of one implementation for step 702 in FIG. 7.

The process automatically maps the format of the output from the artificial intelligence model to the expected format used by the application (step 1100). The process terminates thereafter.

Figure 12:
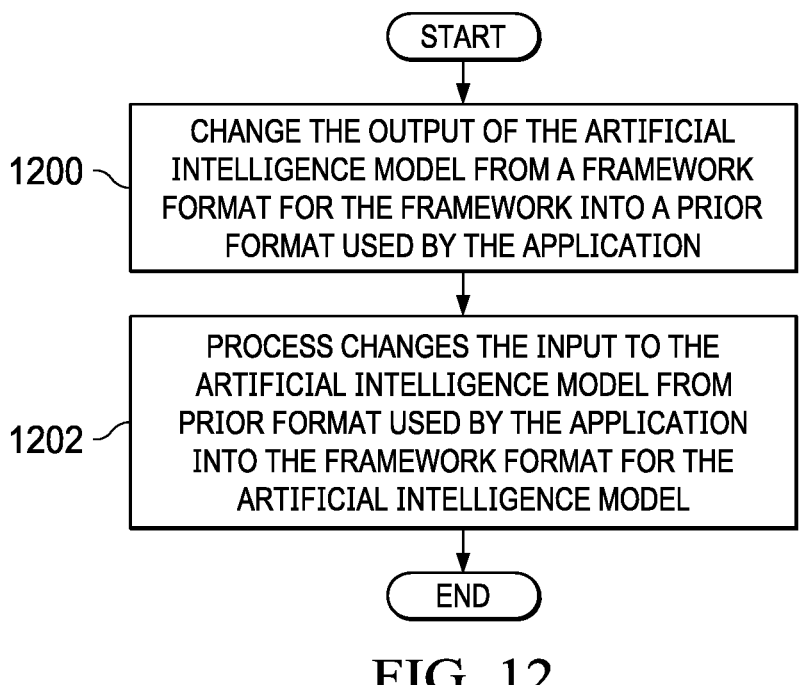
FIG. 12 is a flowchart of a process for changing a format of information in accordance with an illustrative embodiment.

With reference to FIG. 12, a flowchart of a process for changing a format of information is depicted in accordance with an illustrative embodiment. The process in this flowchart is an example of one implementation for step 702 in FIG. 7.

The process changes the output of the artificial intelligence model from a framework format for the framework into a prior format used by the application (step 1200). The process changes the input to the artificial intelligence model from prior format used by the application into the framework format for the artificial intelligence model (step 1202). The process terminates thereafter.

Figure 13:
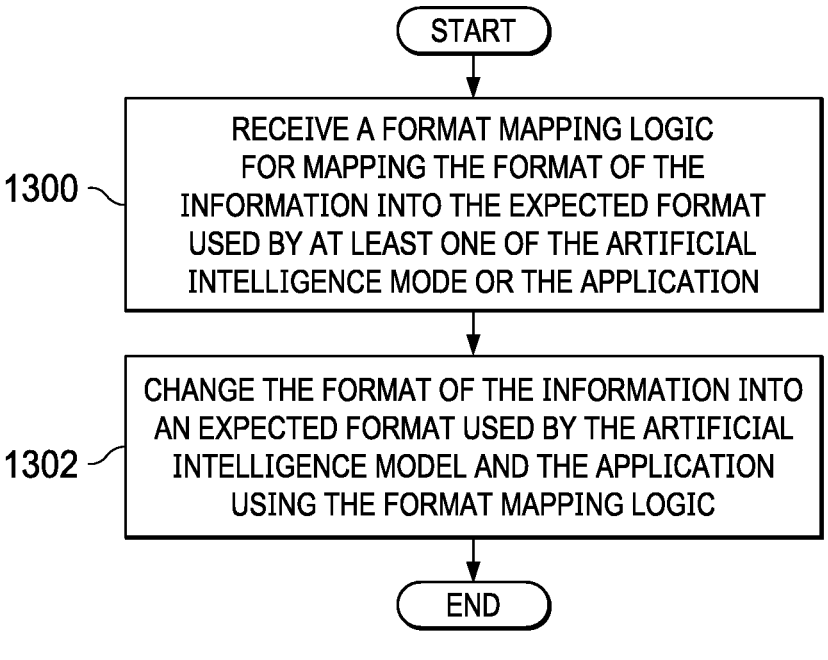
FIG. 13 is a flowchart of a process for changing a format of information in accordance with an illustrative embodiment.

Turning next to FIG. 13, a flowchart of a process for changing a format of information is depicted in accordance with an illustrative embodiment. The process in this flowchart is an example of one implementation for step 702 in FIG. 7.

The process receives a format mapping logic for mapping the format of the information into the expected format used by at least one of the artificial intelligence model or the application (step 1300). The process changes the format of the information into an expected format used by the artificial intelligence model and the application using the format mapping logic (step 1302). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 14:
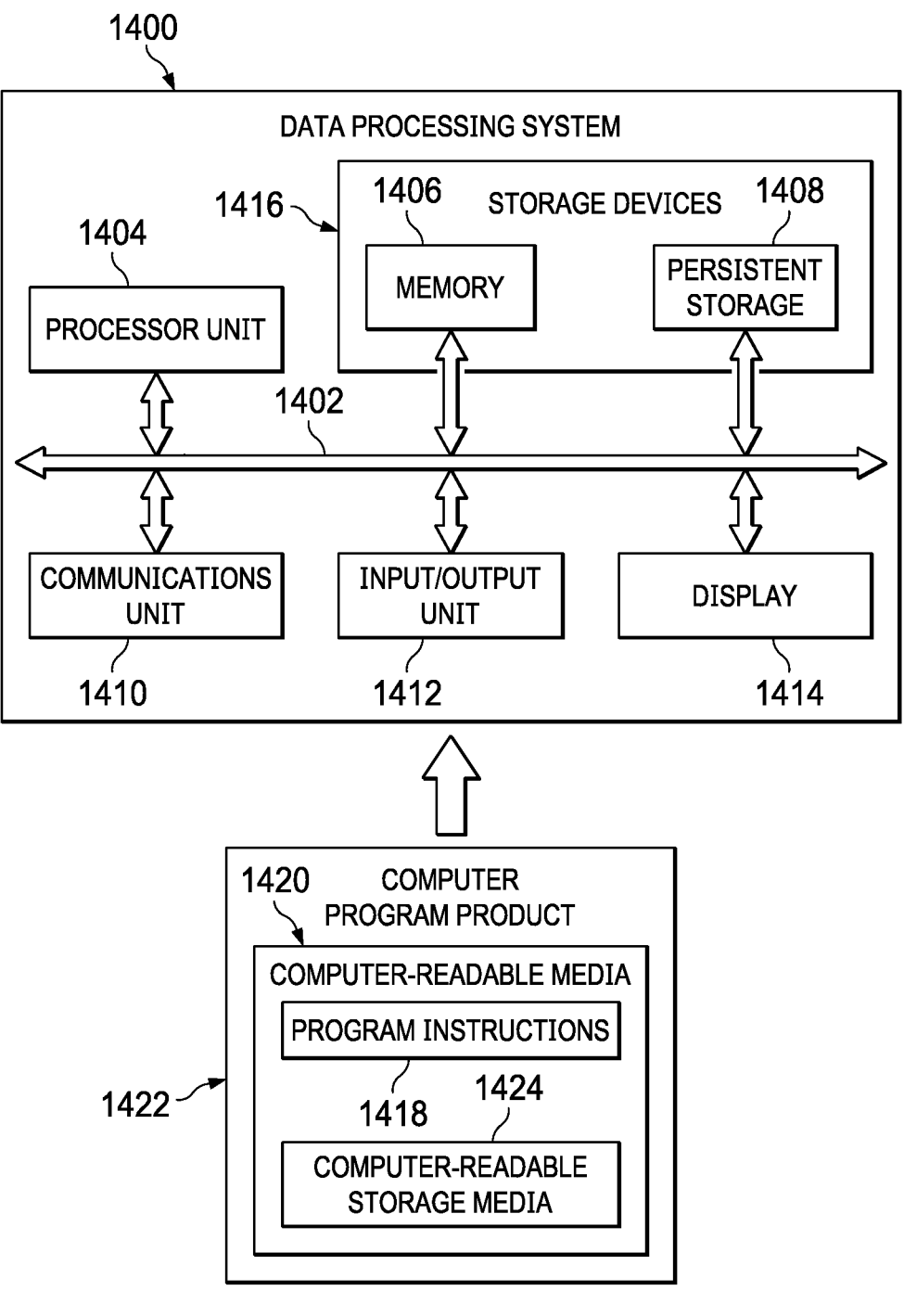
FIG. 14 is a block diagram of a data processing system in accordance with an illustrative embodiment.

Turning now to FIG. 14, a block diagram of a data processing system is depicted in accordance with an illustrative embodiment. Data processing system 1400 can be used to implement computers in hardware and software layer 202 in FIG. 2 as well as server computer 304, server computer 306, and client devices 310 in FIG. 3. Data processing system 1400 can also be used to implement computer system 408 in FIG. 4. In this illustrative example, data processing system 1400 includes communications framework 1402, which provides communications between processor unit 1404, memory 1406, persistent storage 1408, communications unit 1410, input/output (I/O) unit 1412, and display 1414. In this example, communications framework 1402 takes the form of a bus system.

Processor unit 1404 serves to execute instructions for software that can be loaded into memory 1406. Processor unit 1404 includes one or more processors. For example, processor unit 1404 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1404 can may be implemented using one or more heterogeneous processor systems in which a main processor is present with secondary processors on a single chip. As another illustrative example, processor unit 1404 can be a symmetric multi-processor system containing multiple processors of the same type on a single chip.

Memory 1406 and persistent storage 1408 are examples of storage devices 1416. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1416 may also be referred to as computer-readable storage devices in these illustrative examples. Memory 1406, in these examples, can be, for example, a random-access memory or any other suitable volatile or non-volatile storage device. Persistent storage 1408 may take various forms, depending on the particular implementation.

For example, persistent storage 1408 may contain one or more components or devices. For example, persistent storage 1408 can be a hard drive, a solid-state drive (SSD), a flash memory, a rewritable optical disk, a rewritable magnetic tape, or some combination of the above. The media used by persistent storage 1408 also can be removable. For example, a removable hard drive can be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that can be connected to data processing system 1400. For example, input/output unit 1412 may provide a connection for user input through at least one of a keyboard, a mouse, or some other suitable input device. Further, input/output unit 1412 may send output to a printer. Display 1414 provides a mechanism to display information to a user.

Instructions for at least one of the operating system, applications, or programs can be located in storage devices 1416, which are in communication with processor unit 1404 through communications framework 1402. The processes of the different embodiments can be performed by processor unit 1404 using computer-implemented instructions, which may be located in a memory, such as memory 1406.

These instructions are referred to as program instructions, computer usable program instructions, or computer-readable program instructions that can be read and executed by a processor in processor unit 1404. The program instructions in the different embodiments can be embodied on different physical or computer-readable storage media, such as memory 1406 or persistent storage 1408.

Program instructions 1418 is located in a functional form on computer-readable media 1420 that is selectively removable and can be loaded onto or transferred to data processing system 1400 for execution by processor unit 1404. Program instructions 1418 and computer-readable media 1420 form computer program product 1422 in these illustrative examples. In the illustrative example, computer-readable media 1420 is computer-readable storage media 1424.

Computer-readable storage media 1424 is a physical or tangible storage device used to store program instructions 1418 rather than a medium that propagates or transmits program instructions 1418. Computer-readable storage media 1424, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1418 can be transferred to data processing system 1400 using a computer-readable signal media. The computer-readable signal media are signals and can be, for example, a propagated data signal containing program instructions 1418. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1420" can be singular or plural. For example, program instructions 1418 can be located in computer-readable media 1420 in the form of a single storage device or system. In another example, program instructions 1418 can be located in computer-readable media 1420 that is distributed in multiple data processing systems. In other words, some instructions in program instructions 1418 can be located in one data processing system while other instructions in program instructions 1418 can be located in one data processing system. For example, a portion of program instructions 1418 can be located in computer-readable media 1420 in a server computer while another portion of program instructions 1418 can be located in computer-readable media 1420 located in a set of client computers.

The different components illustrated for data processing system 1400 are not meant to provide architectural limitations to the manner in which different embodiments can be implemented. In some illustrative examples, one or more of the components may be incorporated in or otherwise form a portion of, another component. For example, memory 1406, or portions thereof, may be incorporated in processor unit 1404 in some illustrative examples. The different illustrative embodiments can be implemented in a data processing system including components in addition to or in place of those illustrated for data processing system 1400. Other components shown in FIG. 14 can be varied from the illustrative examples shown. The different embodiments can be implemented using any hardware device or system capable of running program instructions 1418.

Thus, the illustrative embodiments provide a computer implemented method, apparatus, computer system, and computer program product for managing an artificial intelligence model. A number of processor units detect a change in a format used to exchange information between the artificial intelligence model and an application using the artificial intelligence model. The number of processor units changes the format of the information into an expected format used by the artificial intelligence model and the application. The number of processor units exchanges the information between the artificial intelligence model and the application using the expected format.

With an illustrative example, changes to applications that use artificial intelligence models is unnecessary. Instead, an information manager can change the format of at least one of an input or output into a format that is expected for use by at least one of the artificial intelligence model or the application. As result, no changes are needed to the artificial intelligence model or the application to exchange information between the artificial intelligence model and the application. As a result, applications are insulated from changes in artificial intelligence models.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for managing an artificial intelligence model by an artificial intelligence manager running on a server data processing system coupled to a client device via a communication network, the computer implemented method comprising:

receiving, by a number of processor units using the artificial intelligence manager running on the server data processing system, a request generated by an application using the artificial intelligence model, wherein the application is running on the client device;

sending, by the number of processor units using the artificial intelligence manager running on the server data processing system, the request to the artificial intelligence model;

receiving, by the number of processor units using the artificial intelligence manager running on the server data processing system, a reply generated by the artificial intelligence model;

sending, by the number of processor units using the artificial intelligence manager running on the server data processing system, the reply to the application running on the client device;

detecting, by the number of processor units using the artificial intelligence manager running on the server data processing system, a change in a data transmission format used to exchange information over the communication network between the artificial intelligence model and the application;

changing, by the number of processor units using the artificial intelligence manager running on the server data processing system, the data transmission format used to exchange the information over the communication network between the artificial intelligence model and the application into an expected data transmission format used by the artificial intelligence model and the application in response to the artificial intelligence manager detecting the change in the data transmission format; and exchanging, by the number of processor units using the artificial intelligence manager running on the server data processing system, the information between the artificial intelligence model and the application using the expected data transmission format in response to the artificial intelligence manager changing the data transmission format of the information, wherein information exchanged between the artificial intelligence model and the application is selected from one of an output from the artificial intelligence model, an input to the artificial intelligence model, and the output from the artificial intelligence model and the input to the artificial intelligence model, wherein the input to the artificial intelligence model is a query request sent to the artificial intelligence model from the application via the communication network and the output from the artificial intelligence model is a query request result generated by the artificial intelligence model as a result of the artificial intelligence model receiving the query request sent to the artificial intelligence model from the application via the communication network.

2. The computer implemented method of claim 1, wherein detecting, by the number of processor units using the artificial intelligence manager running on the server data processing system, the change in the data transmission format used to exchange the information between the artificial intelligence model and the application comprises:

detecting, by the number of processor units using the artificial intelligence manager running on the server data processing system, a framework change for the artificial intelligence model, wherein the framework change for the artificial intelligence model changes the data transmission format of how the information is exchanged between the artificial intelligence model and the application using the artificial intelligence model.

3. The computer implemented method of claim 2, wherein changing, by the number of processor units using the artificial intelligence manager running on the server data processing system, the data transmission format of the information exchanged between the artificial intelligence model and the application comprises:

changing, by the number of processor units using the artificial intelligence manager running on the server data processing system, the output of the artificial intelligence model from the framework format for the framework into a prior data transmission format used by the application; and changing, by the number of processor units using the artificial intelligence manager, the input to the artificial intelligence model from the prior data transmission format used by the application into the framework format for the artificial intelligence model.

4. The computer implemented method of claim 1, wherein detecting, by the number of processor units using the artificial intelligence manager running on the server data processing system, the change in the data transmission format used to exchange the information between the artificial intelligence model and the application comprises:

profiling, by the number of processor units using the artificial intelligence manager running on the server data processing system, the data transmission format of an input and an output of the artificial intelligence model by comparing, by the number of processor units, the input and the output of the artificial intelligence model to a prior input and a prior output for the artificial intelligence model identified from a historical database of inputs and outputs for the artificial intelligence model to form a comparison; and using, by the number of processor units using the artificial intelligence manager running on the server data processing system, the comparison to detect the change in at least one of the input or the output of the artificial intelligence model.

5. The computer implemented method of claim 1, wherein changing, by the number of processor units using the artificial intelligence manager running on the server data processing system, the data transmission format of the information comprises:

automatically mapping, by the number of processor units using the artificial intelligence manager running on the server data processing system, the data transmission format of the input from the application to the expected data transmission format used by the artificial intelligence model.

6. The computer implemented method of claim 1, wherein changing, by the number of processor units using the artificial intelligence manager running on the server data processing system, the data transmission format of the information comprises:

automatically mapping, by the number of processor units using the artificial intelligence manager running on the server data processing system, the data transmission format of the output from the artificial intelligence model to the expected data transmission format used by the application.

7. The computer implemented method of claim 1, wherein changing, by the number of processor units using the artificial intelligence manager running on the server data processing system, the data transmission format of the information comprises:

receiving, by the number of processor units via the communication network using the artificial intelligence manager running on the server data processing system, a format mapping logic for mapping the data transmission format of the information into the expected data transmission format used by at least one of the artificial intelligence model or the application; and changing, by the number of processor units using the artificial intelligence manager running on the server data processing system, the data transmission format of the information into the expected data transmission format used by the artificial intelligence model and the application using the format mapping logic received by the number of processor units via the communication network.

8. The computer implemented method of claim 1, wherein the data transmission format of the information exchanged between the artificial intelligence model and the application is changed into the expected data transmission format used by the artificial intelligence model and the application using at least one of an application programming interface or code containing a logic for converting the information into the expected data transmission format.

9. A computer system for managing an artificial intelligence model by an artificial intelligence model management system coupled to a client device via a communication network, comprising:

a number of processor units, wherein the number of processor units executes program instructions to:

receive, using the artificial intelligence model management system, a request generated by an application using the artificial intelligence model, wherein the application is running on the client device;

send, using the artificial intelligence model management system, the request to the artificial intelligence model;

receive, using the artificial intelligence model management system, a reply generated by the artificial intelligence model;

send, using the artificial intelligence model management system, the reply to the application running on the client device;

detect, using the artificial intelligence model management system, a change in a data transmission format used to exchange information over the communication network between an artificial intelligence model and the application;

change, using the artificial intelligence model management system, the data transmission format used to exchange the information over the communication network between the artificial intelligence model and the application into the expected data transmission format used by the artificial intelligence model and the application in response to the artificial intelligence model management system detecting the change in the data transmission format; and exchange, using the artificial intelligence model management system, the information between the artificial intelligence model and the application using the expected data transmission format in response to the artificial intelligence model management system changing the data transmission format of the information, wherein the information exchanged between the artificial intelligence model and the application is selected from one of an output from the artificial intelligence model, an input to the artificial intelligence model, and the output from the artificial intelligence model and the input to the artificial intelligence model, wherein the input to the artificial intelligence model is a query request sent to the artificial intelligence model from the application via the communication network and the output from the artificial intelligence model is a query request result generated by the artificial intelligence model as a result of the artificial intelligence model receiving the query request sent to the artificial intelligence model from the application via the communication network.

10. The computer system of claim 9, wherein in detecting the change in the data transmission format used to exchange the information between the artificial intelligence model and the application, the number of processor units executes program instructions to:

detect, using the artificial intelligence model management system, a framework change for the artificial intelligence model, wherein the framework change for the artificial intelligence model changes the data transmission format of how the information is exchanged between the artificial intelligence model and the application using the artificial intelligence model.

11. The computer system of claim 9, wherein in changing the data transmission format of the information exchanged between the artificial intelligence model and the application, the number of processor units executes program instructions to:

changing, using the artificial intelligence model management system, the output of the artificial intelligence model from the framework format for the framework into a prior data transmission format used by the application; and changing, using the artificial intelligence model management system, the input to the artificial intelligence model from the prior data transmission format used by the application into the framework format for the artificial intelligence model.

12. The computer system of claim 9, wherein the computer system comprises a plurality of data processing systems coupled together via the communication network, wherein the application runs on a client data processing system of the plurality of data processing systems and the artificial intelligence model runs on a server data processing system of the plurality of data processing systems, and wherein in detecting the change in the data transmission format used to exchange the information between the artificial intelligence model and the application, the number of processor units executes program instructions to:

profile, using the artificial intelligence model management system, the data transmission format of an input and an output of the artificial intelligence model, including compare the input and the output of the artificial intelligence model to a prior input and a prior output for the artificial intelligence model identified from a historical database of inputs and outputs for the artificial intelligence model to form a comparison; and use, using the artificial intelligence model management system, the comparison to detect the change in at least one of the input or the output of the artificial intelligence model.

13. The computer system of claim 12, wherein changing the data transmission format of the information, the number of processor units executes program instructions to:

receive, via the communication network using the artificial intelligence model management system, a format mapping logic for mapping the data transmission format of the information into the expected data transmission format used by at least one of the artificial intelligence model or the application; and change, using the artificial intelligence model management system, the data transmission format of the information into the expected data transmission format used by the artificial intelligence model and the application using the format mapping logic received by the number of processor units via the communication network.

14. The computer system of claim 9, wherein in changing the data transmission format of the information, the number of processor units executes program instructions to:

automatically map, using the artificial intelligence model management system, the data transmission format of the input from the application to the expected data transmission format used by the artificial intelligence model.

15. The computer system of claim 9, wherein in changing the data transmission format of the information, the number of processor units executes program instructions to:

automatically map, using the artificial intelligence model management system, the data transmission format of the output from the artificial intelligence model to the expected data transmission format by used the application.

16. The computer system of claim 9, wherein the data transmission format of the information exchanged between the artificial intelligence model and the application is changed into the expected data transmission format used by the artificial intelligence model and the application using at least one of an application programming interface or code containing a logic for converting the information into the expected data transmission format.

17. A computer program product for managing an artificial intelligence model by an artificial intelligence manager running on a server data processing system coupled to a client device via a communication network, the computer program product comprising a computer readable storage medium having program instructions embodied therewith, the program instructions executable by a computer system to cause the computer system to perform a method of:

receiving, using the artificial intelligence manager running on the server data processing system, a request generated by an application using the artificial intelligence model, wherein the application is running on the client device;

sending, using the artificial intelligence manager running on the server data processing system, the request to the artificial intelligence model;

receiving, using the artificial intelligence manager running on the server data processing system, a reply generated by the artificial intelligence model;

sending, using the artificial intelligence manager running on the server data processing system, the reply to the application running on the client device;

detecting, using the artificial intelligence manager running on the server data processing system, a change in a data transmission format used to exchange information over the communication network between the artificial intelligence model and the application;

changing, using the artificial intelligence manager running on the server data processing system, the data transmission format used to exchange the information over the communication network between the artificial intelligence model and the application into an expected data transmission format used by the artificial intelligence model and the application in response to the artificial intelligence manager detecting the change in the data transmission format; and exchanging, using the artificial intelligence manager running on the server data processing system, the information between the artificial intelligence model and the application using the expected data transmission format in response to the artificial intelligence manager changing the data transmission format of the information, wherein the information exchanged between the artificial intelligence model and the application is selected from one of an output from the artificial intelligence model, an input to the artificial intelligence model, and the output from the artificial intelligence model and the input to the artificial intelligence model, wherein the input to the artificial intelligence model is a query request sent to the artificial intelligence model from the application via the communication network and the output from the artificial intelligence model is a query request result generated by the artificial intelligence model as a result of the artificial intelligence model receiving the query request sent to the artificial intelligence model from the application via the communication network, and wherein detecting, by the number of processor units, the change in the data transmission format used to exchange information between the artificial intelligence model and an application comprises:

profiling, using the artificial intelligence manager running on the server data processing system, the data transmission format of an input and an output of the artificial intelligence model by comparing, by the number of processor units, the input and the output of the artificial intelligence model to a prior input and a prior output for the artificial intelligence model identified from a historical database of inputs and outputs for the artificial intelligence model to form a comparison; and using, using the artificial intelligence manager running on the server data processing system, the comparison to detect the change in at least one of the input or the output of the artificial intelligence model.

* * * * *